Dec. 7, 1943.  V. PAMPALLONA  2,336,121
BOLT AND NUT
Filed May 19, 1943
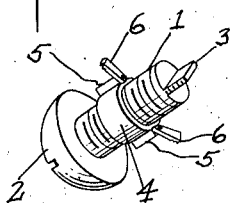
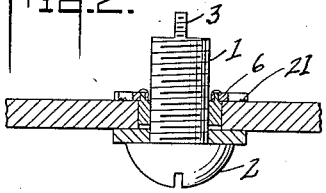
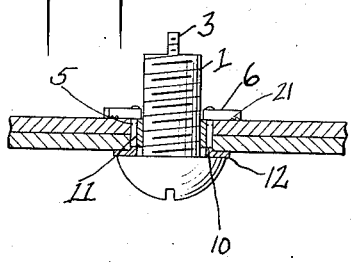
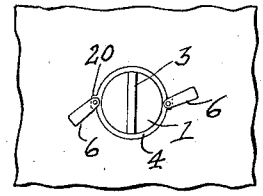
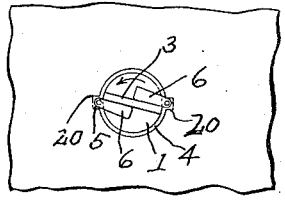
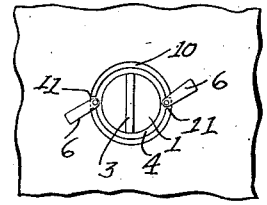
INVENTOR.
VINCENT PAMPALLONA
BY James Cottrell
ATTORNEY Patented Dec. 7, 1943

2,336,121

UNITED STATES PATENT OFFICE 2,336,121

BOLT AND NUT

Vincent Pampallona, New York, N. Y.

Application May 19, 1943, Serial No. 487,629

7 Claims. (Cl. 85—1)

This invention relates to improvement in bolts and nuts; and more particularly to devices for securing two or more plates together by manipulations on one side of the plates only.

It is often necessary to secure plates to boilers and other structures, where one side, such as the inside of the boiler, is inaccessible. Numerous expedients have been proposed for this purpose, but they have proven to be ineffective or too expensive, and in many cases not adapted to certain situations.

It is, therefore, an object of this invention to provide a bolt and nut device for securing plates and the like together, which device is simple in structure and adapted for use in inaccessible places.

A further object is the provision of a device for securing plates and the like together, which device can be conveniently and effectively manipulated from one side of the plates only.

These and other objects are attained by the novel structure and arrangement of parts hereinafter described and illustrated in the accompanying drawing, forming a part hereof, and in which:

Fig. 1 is a perspective view of a bolt and nut device embodying the invention.

Fig. 2 is a sectional view showing the manner in which the device is employed to secure two plates together.

Fig. 3 is a bottom view of the device when holding plates together.

Fig. 4 is a sectional view of the device used in combination with a bushing when employed in a circular aperture.

Fig. 5 is a bottom view of the device shown in Fig. 4.

Fig. 6 is a bottom view of the device before the bolt has been rotated.

Referring to the drawing, the fastening device is shown to comprise a threaded bolt 1, having a head 2, preferably of the screw type to enable it to be manipulated by a screwdriver or similar tool. The bolt 1 has one end provided with a web 3, having a width equal to the diameter of the bolt.

Threaded on the bolt 1 is a short sleeve 4 having a pair of projecting flanges 5 extending longitudinally of the sleeve. Pivoted to the projecting flanges 5 are a pair of arms 6 adapted to be engaged by the web 3 when in the position shown in Fig. 6. The structure above described is adapted for use in a non-circular aperture or in a circular aperture having communicating diagonal slots 20 to accommodate the flanges 5, to prevent rotation of the sleeve 4.

In operation, the bolt 1 with the sleeve 4 thereon is inserted into the aperture and rotary movements of the sleeve are prevented by engagement of the flanges 5 with the plates being secured together, the flanges being positioned in the diagonal slots 20, or if the aperture is square, see Fig. 2, the flanges will engage adjacent sides of the square. As the bolt 1 is rotated and moves in threaded engagement with the sleeve 4, the web 3 engages the arms 6 and moves them to the position shown in Fig. 3 where they are beneath the plates and encompass a diameter greater than the diameter of the aperture.

Since the sleeve 4 cannot rotate, rotation of the bolt 1 will cause the sleeve 4 to move longitudinally until the arms 6 are in tight engagement with the underside of the plate, that is, the inaccessible side. The bolt and sleeve cannot now be withdrawn, and the plates are held tightly together.

When the aperture is circular, a bushing 10 is placed over the sleeve 4, the bushing being provided with slots 11 to accommodate the flanges 5, and having a flange 12 of greater diameter than the aperture or the head 2 of the bolt. In applying this device to a circular aperture, the flange 12 is held by the fingers to prevent rotation of the bushing, and since the flanges 5 are positioned in the slots 11, rotation of the sleeve 4 is also prevented when the bolt is rotated. As the bolt is rotated, the arms 6 are swung outwardly as described above, and continued rotation of the bolt will cause the arms 6 to tightly engage the inaccessible side of one of the plates and prevent withdrawal of the bolt.

To provide a biting grip of the arms 6 into the plate, the arms are serrated at 21 as shown in Fig. 4.

From the above description it will be seen that there has been provided a simple and effective device for readily and conveniently securing two or more plates together in situations where one side of one of the plates is inaccessible such as in the interior of a boiler or the like.

The above description is to be considered as illustrative and not limitative of the invention, of which obviously numerous modifications and uses can be made without departing from the spirit of the appended claims.

I claim:

1. A device for securing plates together, comprising a threaded bolt having a head, one end of the bolt being provided with a web as wide as the bolt, a sleeve threaded on the bolt, projections on the sleeve, and arms pivoted to the sleeve, said arms being engaged and rotated by the web when the bolt is rotated, the pivotal axes of said arms being parallel to the axis of the sleeve and bolt whereby the arms are caused to rotate in a plane normal to the axis of the bolt.

2. A device for securing plates together, comprising a threaded bolt, one end of the bolt being provided with a web as wide as the bolt, a sleeve threaded on the bolt, and arms pivoted to the sleeve, said web engaging and rotating the arms when the bolt is rotated, the pivotal axes of said arms being parallel to the axis of the sleeve and bolt whereby the arms are caused to rotate in a plane normal to the axis of the bolt.

3. A device for securing plates together, comprising a threaded bolt, a sleeve threaded on the bolt, arms pivoted to the sleeve for rotation in a plane at right angles to the axis of the sleeve, and means on the bolt engaging and rotating the arms when the bolt is initially rotated.

4. A device for securing plates together, comprising a threaded bolt having a head, a sleeve threaded on the bolt and having flanges projecting therefrom, arms pivoted to the flanges, a bushing encompassing the sleeve and having slots in which the flanges are positioned to prevent rotation of the sleeve, said bushing having a flange engaging the head and having a greater diameter than the head, and means on the bolt to rotate the arms when the bolt is initially rotated.

5. A device for securing plates together, comprising a threaded bolt having a head, a sleeve threaded on the bolt, arms pivoted to the sleeve for rotation in a plane at right angles to the axis of the sleeve, a bushing encompassing the sleeve, means on the sleeve and bushing cooperating to prevent rotation of the sleeve, and means on the bolt to rotate the arms when the bolt is initially rotated.

6. A device for securing plates together, comprising a threaded bolt having a head, a sleeve threaded on the bolt and having flanges projecting therefrom, arms pivoted to the flanges, a bushing encompassing the sleeve and having slots in which the flanges are positioned to prevent rotation of the sleeve, and means on the bolt to rotate the arms when the bolt is initially rotated.

7. A device for securing plates together, comprising a threaded bolt having a head, a sleeve threaded on the bolt, arms mounted on the sleeve for rotation in a plane at right angles to the axis of the sleeve, means on the bolt to rotate the arms when the bolt is initially rotated, a bushing encompassing the sleeve, and means on the sleeve and bushing cooperating to prevent rotation of the sleeve, said bushing having a flange engaging the head and having a greater diameter than the head.

VINCENT PAMPALLONA.